Patented Dec. 26, 1933

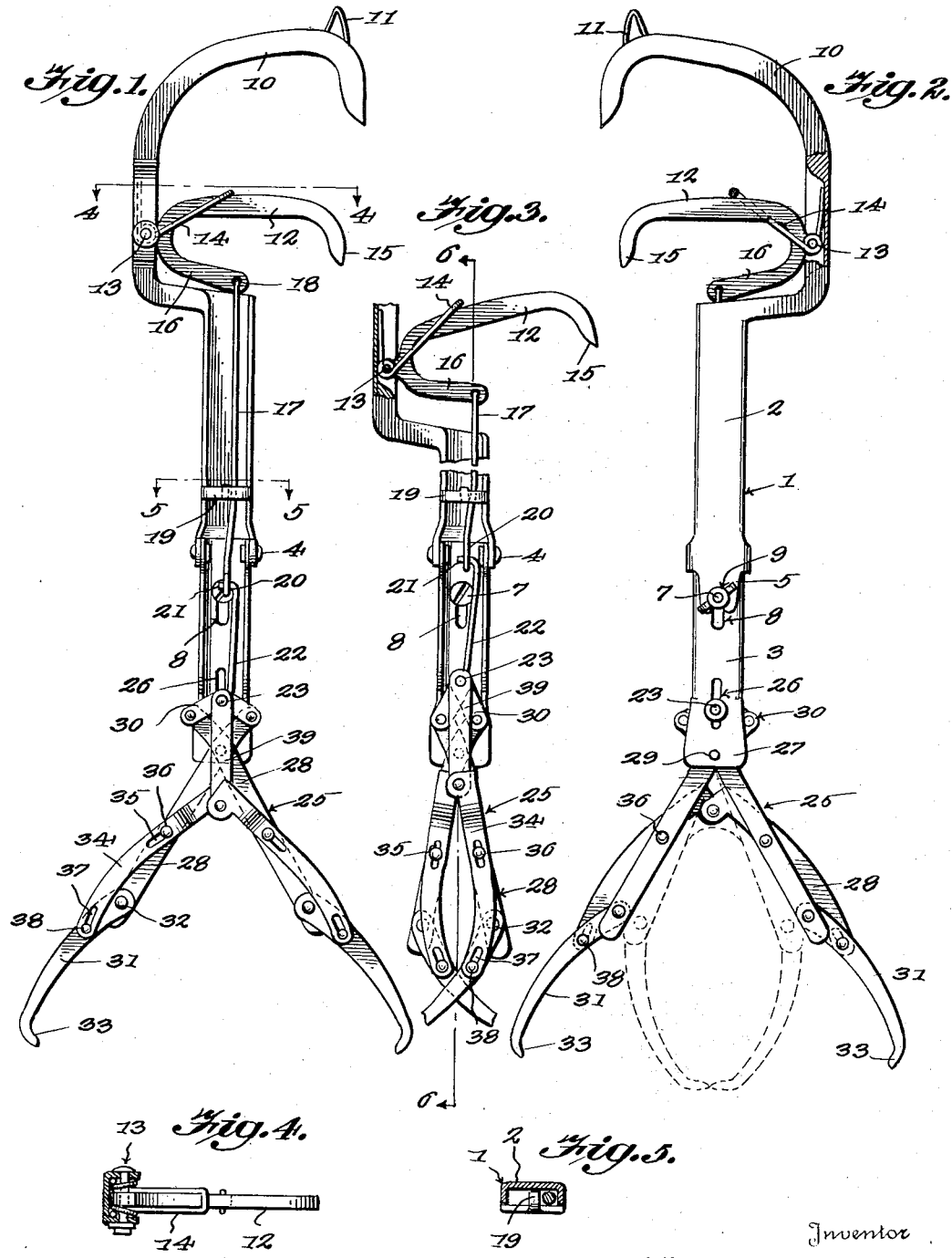

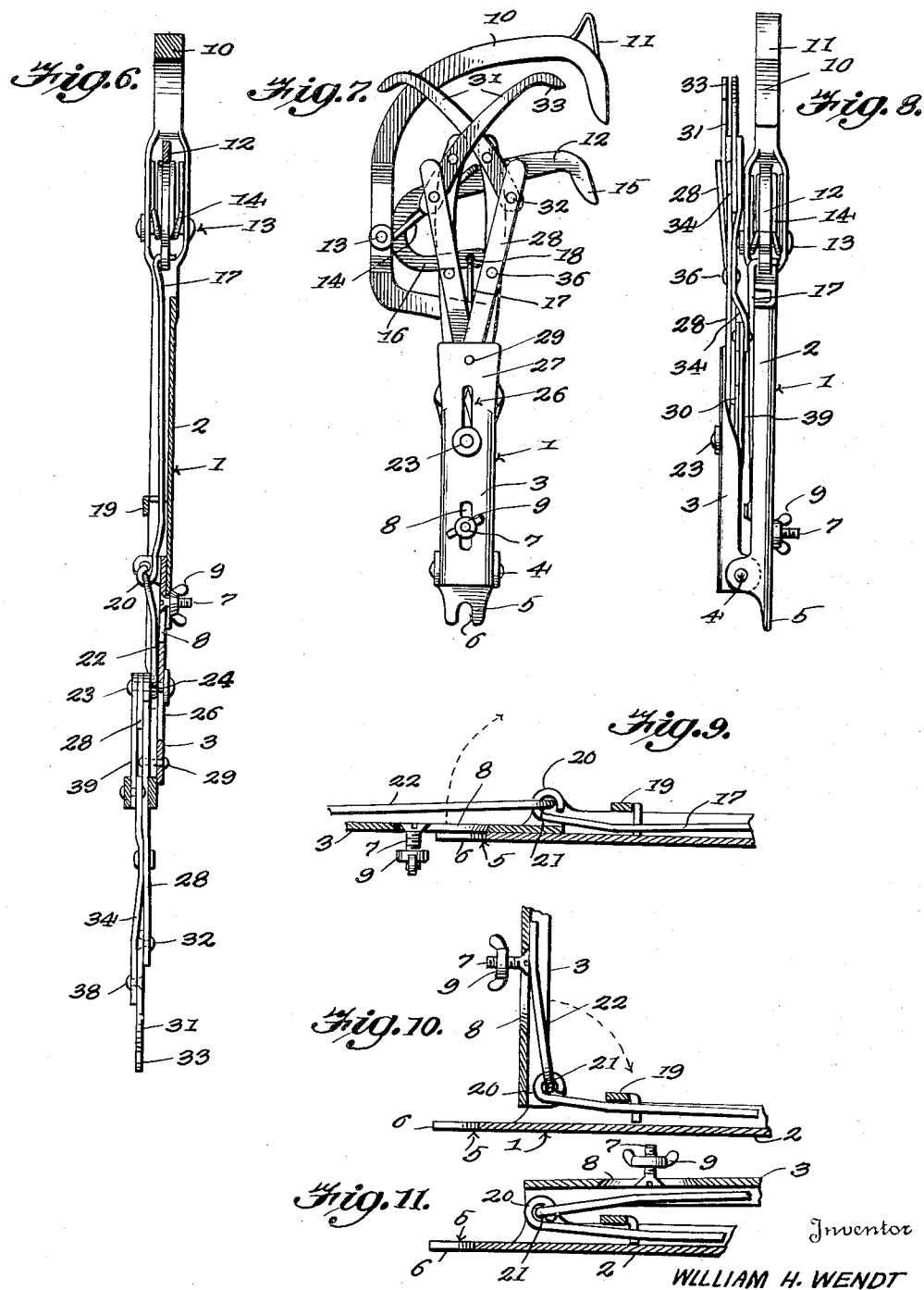

1,941,064

UNITED STATES PATENT OFFICE 1,941,064

FISH TONGS

William H. Wendt, Little Falls, Minn.

Application February 3, 1932. Serial No. 590,750

6 Claims. (Cl. 119—154)

This invention relates to fish tongs or gaffs, and has for its object the production of a simple and efficient fish tong which is provided with a specially constructed fish-gripping end whereby the body of a fish may be completely circled by the gripping jaws of the tongs without injury to the body of the fish.

Another object of this invention is the production of a simple and efficient toggle arrangement for efficiently gripping the body of a fish and facilitating the handling thereof.

A still further object of this invention is the production of a simple and efficient foldable fish tong, whereby the shank of the tong may be folded so as to accommodate the fish tong when folded, in an ordinary tackle box.

A still further object of this invention is the production of a simple and efficient fish tong, the operating link of which is so assembled and connected with the gripping toggle as to permit the shank to be readily folded when the operating link is pulled inwardly, thereby permitting the folding of the tongs without disassembling the connection between the operating grip or trigger and the gripping tongs or toggles.

With these and other objects in view, the invention consists in certain novel constructions, combinations and arrangements of parts as will be hereinafter fully described and claimed.

In the drawings:—

Figure 1 is a side elevation of the fish tongs;

Figure 2 is a side elevation of the fish tongs looking at an opposite side with respect to that shown in Figure 1, a certain portion of the hand grip being shown in section;

Figure 3 is a fragmentary side elevation looking at the inner face of the tongs, a portion of the hand grip being broken away and a portion of the outer toggle fingers being broken away, the toggle members being shown in a contracted position;

Figure 4 is a section taken on line 4—4 of Figure 1;

Figure 5 is a section taken on line 5—5 of Figure 1;

Figure 6 is a section taken on line 6—6 of Figure 3, the section extending through the entire length of the fish tongs;

Figure 7 is a side elevation of the tongs in a folded position;

Figure 8 is an edge elevation of the tongs in a folded position;

Figure 9 is a longitudinal sectional view taken on a plane defined by line 6—6 of Figure 3 through the pivot connection between the sections of the shank of the toggle, showing the sections in an extended position and the arrangement of the connecting pull-rods in a position ready for folding;

Figure 10 is a longitudinal sectional view similar to Figure 9 taken on a plane defined by line 6—6 of Figure 3, one section of the shank being shown in a partly folded position; and Figure 11 is a view similar to Figures 9 and 10, one section of the shank being shown in folded position.

By referring to the drawings, it will be seen that 1 designates the shank of the fish tongs which comprises a primary section 2 and an auxiliary section 3, which sections are pivotally connected together, as at 4, the primary section 2 having a projecting and overhanging tongue 5 which is bifurcated as at 6, for receiving the clamping bolt 7 which is carried by the auxiliary section 3, the bolt 7 passing through the elongated slot 8 formed in the auxiliary section 3. A thumb nut 9 is threaded upon the clamping bolt 7 and is adapted to firmly engage the tongue 5 and firmly lock the primary and auxiliary sections 2 and 3 of the shank 1, in extended positions such as is shown in Figures 1, 2, 3, and 6. The bolt or screw 7 may be moved longitudinally within the slot 8 for the purpose of disengaging the bifurcated portion 6 of the tongue 5 when it is desired to fold the auxiliary section 3 back upon the primary section 2 of the shank 1.

The primary section 2 of the shank 1 is provided with a hook-shaped hand-grip 10, having a hand abutment stop 11 formed near the top and one side thereof to facilitate the gripping of the hand-grip 10 by the operator. This hook-shaped grip 10 preferably extends laterally of the shank 1, as shown in Figure 2, in order to house the trigger member 12, which trigger member 12 is pivotally secured to the grip portion 10, as at 13, and a coil spring 14 is carried by the grip portion 10 and engages the trigger member 12 to hold the trigger member 12 under tension. This trigger member 12 is provided with a hooked end 15 to facilitate the gripping of the trigger and prevent the slipping of the fingers from the trigger 12. The trigger 12 is also provided with a projecting finger 16 which is connected to the link 17 of the pull-rod, as at 18. The bridge 19 is formed upon the primary section 2 of the shank 1 and spans the link 17 to hold the same against accidental displacement from the primary section 2 of the shank 1. The outer extremity of the link 17 is provided with an eye 20 which engages the off-set end 21 of the pull-rod link 22 and this pull-rod link 22 is provided with a suitable eye or similar connection 24 for engaging the pivot pin 23 of the toggle arrangement 25. This pin 23 is slidably mounted within the longitudinally extending slot 26 formed in the auxiliary section 3 of the shank 1, as shown in Figures 2 and 6 of the drawings. As shown in Figure 2, as well as Figures 1 and 3, the auxiliary section 3 of the shank 1 is flared slightly as indicated at 27 to constitute the supporting shoe for the sliding movement of the toggle arrangement 25.

This toggle arrangement comprises a pair of gripping jaws, each gripping jaw embodying the pivoted lever 28 which is pivotally secured, as at 29, to the auxiliary section 3 of the shank 1, and each lever 28 is in turn pivotally connected at its upper end to a link 30, each link 30 of the jaws being in turn pivotally connected to the pin 23, previously described. Finger hooks 31 are pivotally secured as at 32, to the lower ends of the levers 28, which finger hooks 31 are provided with inturned hooked ends 33. Each lever 28 carries the link 34 which is provided with a longitudinally extending slot 35 through which a pin 36 passes for securing the links 34 to the levers 28, as shown. The links 34 are in turn provided with longitudinally extending slots 37 in their outer ends through which the securing pins 38 pass, which pins also engage the lifting hooks 31 at a point beyond the pivot pins 32, as shown. The inner ends of the links 34 are in turn connected to a link 39 which link 39 is also secured to the pivot pin 23 previously described.

The operation of the device is as follows:—The operator will grip the hand-grip 10 in one hand, and pass his fingers under the trigger member 12. Then by pulling upon the trigger member 12, the same will pivot upon its pivot pin 13 and will pull upon the pull-rod 17, thereby pulling upon the links or pull-rod 22 and moving the pin 23 within the longitudinally extending slot 26. This movement of the toggle mechanism will pull upwardly upon the links 30, thereby swinging the levers 28 inwardly at their outer ends, and at the same time pull upwardly upon the links 34 and this will cause the lifting hook fingers 31 to be swung inwardly to a position such as is shown in dotted lines in Figure 2. In this position as shown in dotted lines, the body of a fish may be easily encircled between the jaws of the toggle mechanism without seriously injuring the body of the fish and without killing the fish. The fish may then be swung without injury in the usual manner, while still alive and without serious injury to the fish. The handling of the fish in this manner will greatly facilitate the handling of the fish and will enable the fish to be kept fresh for a considerable length of time, even after the same have been strung.

When it is desired to fold the fish tongs in order to place the same in the usual tackle box, the finger grips 12 will be pulled by the operator after the thumb nut 9 has been first released from the bifurcated portion 6 of the tongue 5. The pulling of the trigger 12 must swing the same to such an extent as to cause the eye 20 to move into approximate alignment with the pivot pins 4, whereupon the auxiliary section 3 may be then swung first to the position shown in Figure 10, and then the position shown in Figure 11, in a completely collapsed position upon the primary section 2, in this way permitting the device to be accommodated in a minimum amount of space and at the same time without the necessity of disconnecting the link 17 and the link 22.

From the foregoing description, it will be seen that a very simple and efficient device has been produced for facilitating the lifting of fish without injury to the body of the fish, and at the same time a device has been produced which is readily foldable or collapsible to accommodate itself to a minimum amount of space with a minimum amount of effort, it only being necessary to release the bolt 7 and move the same out of contact with the bifurcated end 6 and by pulling upon the trigger 12, the two sections of the shank 1 may be swung to a collapsed or folded position.

It should be further understood that certain detail changes in the mechanical construction may be employed without departing from the spirit of the invention, so long as these changes fall within the scope of the appended claims.

Having described the invention, what is claimed as new is:—

1. A device of the class described comprising a shank, said shank comprising a pair of pivotally connected sections, a hand-grip carried by one section, a trigger member carried by said hand grip, a plurality of gripping toggles carried by the other sections, and a sectional link connecting said trigger member with said toggles, said sectional link provided with a pivotal connection intermediate its ends adapted to be brought into line with the pivotal connection of said shank sections as said trigger is pulled whereby said shank sections may be folded one upon the other without disconnecting the link sections of the trigger and toggle members.

2. A device of the class described comprising a sectional shank, means for pivotally connecting the sections of said shank together, a hand-grip carried by one section of said shank, a trigger carried by said hand-grip, a plurality of gripping jaws carried by the other section of said shank, a sectional pull-rod connecting said trigger to said gripping jaws, said sectional pull-rod having a pivot connection between the sections capable of being moved into alignment with the pivot of said shank section whereby one of said shank sections may be folded upon the other shank section without disconnecting said pull-rod from the trigger and gripping jaws, and means for locking the said sections in an extended position.

3. A device of the class described comprising a shank, said shank comprising a primary and an auxiliary section, means for pivotally connecting said sections together, one of said sections provided with a projecting bifurcated tongue, the other section being provided with a longitudinally extending slot, a clamping bolt passing through said slot and adapted to be moved into engagement with said bifurcated tongue, an operating trigger, a sectional pull-rod connected to said trigger, and lifting jaws carried by said shank and connected to said pull-rod for actuating said jaws from said trigger.

4. A fish tong of the class described comprising a shank, a plurality of jaws carried by said shank, means for actuating said jaws, each jaw comprising a pivoted lever arranged in cross relation, links connecting the inner ends of said levers, lifting hooks pivotally secured to the outer ends of said levers, links slidably connected to said levers and said lifting hooks, a link for connecting said first-mentioned and said last-mentioned links, for pulling the outer ends of said lifting hooks inwardly as said levers are moved toward each other, and means for returning the parts to an open position when released.

5. A device of the class described comprising a shank, an operating trigger, a pair of jaws pivotally secured to said shank, means connecting said trigger to said jaws, said jaws comprising a pair of cross pivoted levers secured to said shank, links connecting the inner ends of said levers, lifting hook fingers pivotally secured to the outer ends of said levers, slotted links connecting said levers and hook fingers, means connecting said first and last-mentioned links together whereby said end hooks will be swung inwardly at their outer ends as the levers are moved toward each other to completely encircle the body adapted to be lifted thereby, and spring means engaging said trigger for returning the various parts of said jaws to an open position when said trigger is released.

6. A device of the class described comprising a shank, a hand grip having an open side and also a closed side, a trigger pivotally secured to the closed side of said hand grip and being provided with a projecting extension adapted to be engaged by the fingers of an operator, lifting jaws carried by said shank, a pull rod connected to said jaws and passing longitudinally of the shank, and said trigger having a projecting finger overhanging one end of said shank and engaging said pull rod for facilitating the operation of the said jaws as said trigger is operated.

WILLIAM H. WENDT.